United States Patent [19]

Hunter et al.

[11] Patent Number: 5,112,705

[45] Date of Patent: * May 12, 1992

[54] COATED ANODE CURRENT COLLECTOR FOR ALKALINE CELLS

[75] Inventors: James C. Hunter, Elyria; John C. Nardi, Brunswick; Edwin T. Russell, Medina; Robert F. Scarr, Westlake, all of Ohio

[73] Assignee: Eveready Battery Company, Inc., St. Louis, Mo.

[*] Notice: The portion of the term of this patent subsequent to Feb. 12, 2008 has been disclaimed.

[21] Appl. No.: 395,223

[22] Filed: Aug. 17, 1989

[51] Int. Cl.$^5$ .................... H01M 10/26; H01M 4/66
[52] U.S. Cl. ..................... 429/206; 429/224; 429/229; 429/245; 429/57
[58] Field of Search ............... 429/194, 229, 224, 206

[56] References Cited

U.S. PATENT DOCUMENTS

| | | | |
|---|---|---|---|
| 4,084,047 | 4/1978 | Himy et al. | 429/229 |
| 4,195,120 | 3/1980 | Rossler et al. | 429/50 |
| 4,791,036 | 12/1988 | Schrenk et al. | 429/178 |
| 4,992,343 | 2/1991 | Nardi | 429/206 |

FOREIGN PATENT DOCUMENTS

| | | |
|---|---|---|
| 50-2134 | 1/1975 | Japan . |
| 50-2135 | 1/1975 | Japan . |
| 50-2136 | 1/1975 | Japan . |
| 50-101832 | 8/1975 | Japan . |
| 61-61365 | 3/1986 | Japan . |
| 63-37567 | 2/1988 | Japan . |
| 63-195958 | 8/1988 | Japan . |
| 1-59769 | 3/1989 | Japan . |

*Primary Examiner*—Anthony Skapars
*Attorney, Agent, or Firm*—Robert W. Welsh

[57] ABSTRACT

The invention relates to an alkaline zinc cell that uses a conductive anode current collector comprising a conductive substrate, such as a copper-zinc alloy substrate, and wherein the surface of the substrate is coated with a lead-containing layer containing a discontinuous dispersion of lead to effectively reduce gassing at the surface of the anode current collector during storage of the cell.

19 Claims, No Drawings

COATED ANODE CURRENT COLLECTOR FOR ALKALINE CELLS

FIELD OF THE INVENTION

The invention relates to an alkaline cell employing a zinc anode and wherein the anode current collector used with the zinc anode comprises a substrate coated on its surface with a layer containing a discontinuous dispersion of lead to effectively reduce gassing in the cell during storage.

BACKGROUND OF THE INVENTION

Manufacturers of primary alkaline batteries have long recognized the existence of internal gassing that occurs prior to discharging a cell. This phenomenon, commonly referred to as "shelf gassing," may pressurize a cell such that the flat bottom of a cylindrical battery becomes bulged. One problem created by severely bulged cell bottoms is that the cell may be too long to fit into a battery compartment that is located within a battery operated device. In severe cases, the pressure buildup may activate the cell's safety vent. Electrolyte expelled through the vent can injure people and/or damage the device in which the cell has been placed.

Several methods have been used to minimize the shelf gassing problem. First, the best known method relies upon amalgamation of the anode's zinc surface. This action raises the hydrogen evolution overvoltage on the zinc's surface. As the overvoltage increases, the rate of hydrogen gas generation is restricted. Second, a variety of organic compounds have been used to coat the surface of the zinc. Representative examples of organic corrosion inhibitors can be found in U.S. Pat. No. 3,847,669, or U.S. Pat. No. 4,195,120, which is directed toward the use of organic phosphate esters, or U.S. Pat. No. 4,606,984, which describes a fluorinated molecule that contains an ethoxylated polymer unit. Third, the anode's zinc particles have been altered by incorporating minor quantities of elements such as indium, lead, thallium and/or gallium into the zinc. This combination of zinc and at least one other element may take the form of a surface deposit or an alloy. Fourth, the zinc particles have been modified by heating in order to reduce the number of grain boundaries. Since the gas generating reactions are thought to occur primarily at the grain boundaries, the quantity of gas generated may be reduced as the number of grain boundaries per particle of zinc is reduced. While all of these gassing inhibitors have been claimed to be effective at reducing cell gassing, none of the inhibitors have effectively demonstrated the ability to limit gassing to a very low level in a mercury free cell or in a cell that contains very little mercury.

In alkaline batteries employing conventional type brass anode current collectors, internal gassing is still a major problem. Conventional type brass employed as an anode current collector has a composition of about 65% to 70% copper and about 30% to 35% zinc. With the elimination of mercury in the battery, internal gassing is even more of a problem since it can cause the housing of the battery to expand, i.e., bulged cell bottom, even when using corrosion inhibitors.

It is an object of the present invention to provide an alkaline electrochemical cell with a zinc anode having little or effectively no internal gassing during storage.

It is another object of the present invention to provide a mercury free alkaline electrochemical cell with a zinc anode having little or effectively no internal gassing during storage.

It is another object of the present invention to provide a mercury free alkaline electrochemical cell with a zinc anode and a conductive anode current collector having on its surface a layer of a discontinuous dispersion of lead and wherein said cell has little or effectively no internal gassing during storage.

It is another object of the present invention to provide a mercury free alkaline electrochemical cell with a zinc anode and a conductive anode current collector comprising a substrate having on its surface a layer of a discontinuous dispersion of lead in a lead and zinc mixture and wherein said cell has little or effectively no internal gassing during storage.

It is another object of the present invention to provide a mercury free alkaline electrochemical cell with a zinc anode and an anode current collector comprising a copper-zinc alloy substrate coated with a lead-containing mixture and wherein said cell has little or effectively no internal gassing during storage.

SUMMARY OF THE INVENTION

The invention relates to an electrochemical cell comprising an anode such as zinc, a cathode, an alkaline electrolyte, and a conductive anode current collector comprising a substrate coated with a layer of a discontinuous dispersion of lead in which the amount of lead contained in the layer on the surface of the anode current collector is at least 150 parts per million based on the weight of a 0.1 micron thick portion of the layer on the surface of said substrate. The term discontinuous dispersion means that the lead contained on the surface of the layer on the anode current collector does not form a continuous layer of lead but forms separate areas of lead on the surface.

Cylindrical alkaline cells are generally manufactured with a zinc anode, a manganese dioxide cathode and an alkaline electrolyte. The manganese dioxide is generally pressed up against the inner wall of the cylindrical container and a suitable separator material is fitted in the cavity. A mixture comprising zinc is placed in the interior of the separator and then an anode current collector is placed into the zinc mixture. The anode could be pressed powder as well as zinc in a powdered form distributed throughout an electrolyte gel.

Common choices for the anode current collector are steel, copper, zinc and brass with the most common choice being brass. The typical brass anode current collector has a composition of about 65% to 70% copper and about 30% to 35% zinc. However, in mercury free alkaline cells or alkaline cells containing a very low amount of mercury, the use of a conventional brass anode current collector has been found to contribute to the internal gassing of the cell during storage. It has been discovered that gassing at the surface of a conventional brass current collector can be effectively reduced by replacing the conventional brass with a conductive anode current collector having on its surface a layer of a discontinuous dispersion of a minimum amount of lead. The minimum amount of lead discontinuously dispersed in the layer on the surface of the current collector should be at least 150 parts per million based on the weight of a 0.1 micron thick portion of the layer on the surface of the anode current collector. Preferably, the dispersed lead should be from 500 parts per million to 45,000 parts per million, and more preferably from 1500 parts per million to 30,000 parts per million based on the weight of a 0.1 micron thick portion of the layer on the surface of the anode current collector. The lead can be deposited on the surface by any conventional technique, such as spraying, electroplating or painting. The lead could preferably be deposited as a zinc-lead mixture onto the surface of the conductive substrate as long as the lead is discontinuously dispersed on the surface of the anode current collector. In this embodiment if the substrate is a copper-zinc alloy, then the codepositing of the zinc and lead mixture should cover the exposed copper on the surface of the anode current collector so as to prevent the possibility of any reaction occurring due to the exposure of the copper in the presence of the alkaline electrolyte.

In a zinc alkaline cell using an anode current collector substrate made of a copper-zinc alloy, the copper is required to provide adequate conductivity for the current collector while the zinc will be compatible with the zinc anode. Preferably, the copper should comprise at least 50 weight percent of the copper-zinc alloy with the remainder substantially zinc. More preferably, the copper-zinc alloy substrate could comprise from 60 to 75 weight percent copper and 40 to 25 weight percent zinc.

In addition to a copper-zinc alloy substrate, any conductive material compatible with the electrochemical system of the cell could be used as the material for the substrate of the anode current collector. Thus the anode current collector could be a conductive substrate such as steel, copper, zinc, and alloys thereof coated with a discontinuous dispersion of lead or lead in a lead mixture such as a lead-zinc mixture.

It is believed that the gassing can be further reduced by adding a minor amount of cadmium to the lead-containing layer on the substrate of the anode current collector. It is believed that the cadmium can be dispersed or codeposited along with the lead on the surface of the anode current collector substrate. The cadmium could be added in the lead-containing layer in an amount of at least 1000 parts per million based on the weight of a 0.1 micron thick portion of the lead-containing layer on the surface of the anode current collector.

It is also believed that indium can also be added to the lead-containing layer on the anode current collector to further reduce gassing in the cell. The indium could be dispersed or codeposited along with the lead or lead-containing mixture on the surface of the current collector substrate. It is also believed that the indium could be added in the lead-containing layer in an amount of at least 40 parts per million based on the weight of a 0.1 micron thick portion of the lead-containing layer on the surface of the anode current collector.

The effects, features and advantages of the present invention will be demonstrated in the following examples. It is to be understood that these examples are intended to be illustrative only and therefore should not be interpreted to impose any limitations on the invention as claimed.

EXAMPLE 1

Mercury free "D" size cells were produced using an anode comprised of granular zinc and a gelling agent; a cathode of manganese dioxide, carbon and a binder; and an electrolyte comprised of potassium hydroxide. The components of each cell were placed in a nickel plated steel container which served as both the container and as the cathode's current collector. The variable in each cell was the anode current collector which was either a copper-zinc alloy or a lead-zinc coated copper-zinc alloy. The cells were stored at 71° C. for eight weeks and at intervals the net bulge for each Sample Lot was measured. The average net bulge data are shown in Table 1.

TABLE 1

| Cells Stored at 71° C. | | | |
|---|---|---|---|
| *Sample Lot 1 | | **Sample Lot 2 | |
| Time (weeks) | Bulge (inch) | Time (weeks) | Bulge (inch) |
| 1 | 0.021 | 1 | 0.012 |
| 2 | 0.029 | 2 | 0.014 |
| 3 | 0.030 | 3 | 0.016 |
| 4 | 0.030 | 4 | 0.015 |
| 6 | 0.034 | 6 | 0.016 |
| 8 | 0.034 | 8 | 0.017 |

*Sample Lot 1 consisted of ten cells each employing an anode current collector comprising a copper-zinc alloy obtained commercially as copper alloy No. C26000 containing 68.5 to 71.5 weight percent copper, balance substantially zinc.
**Sample Lot 2 consisted of twenty cells each employing an anode current collector comprising 68.5 to 71.5 weight percent copper, balance substantially zinc. The anode current collector was coated with a lead-zinc mixture containing 2070 parts per million lead based on the weight of the lead-zinc mixture. The coating deposited on the anode current collector was 1.99 microns thick.

The data in Table 1 show that the cells (Sample Lot 1) with no lead-zinc coating on the anode current collector had a substantially greater average bulge than the cells (Sample Lot 2) using an anode current collector coated with a lead-zinc coating. The data show that for cells employing anode current collectors coated with a lead-zinc mixture (Sample Lot 2), the gassing is substantially reduced over cells employing uncoated anode current collectors (Sample Lot 1).

EXAMPLE 2

Mercury free "D" size cells were produced as in Example 1. Again, the variable of each lot was the anode current collector which was either a copper-zinc alloy anode current collector or a lead-zinc coated copper-zinc alloy anode current collector. The cells were stored at 71° C. for three weeks and at weekly intervals the net average bulge for ten cells in each Sample Lot was measured. The average net bulge data are shown in Table 2.

TABLE 2

| Cells Stored at 71° C. | | | |
|---|---|---|---|
| *Sample Lot 1 | | **Sample Lot 2 | |
| Time (weeks) | Bulge (inch) | Time (weeks) | Bulge (inch) |
| 1 | 0.048 | 1 | 0.018 |
| 2 | 0.062 | 2 | 0.028 |
| 3 | 0.058 | 3 | 0.031 |

*Sample Lot 1 consisted of ten cells each employing an anode current collector comprising 68.5 to 71.5 weight percent copper, balance substantially zinc.
**Sample Lot 2 consisted of ten cells each employing an anode current collector comprising 68.5 to 71.5 weight percent copper, balance substantially zinc. The anode current collector was coated with a lead-zinc mixture containing 173 parts per million lead based on the weight of the lead-zinc mixture. The coating deposited on the anode current collector was 0.8 micron thick.

The data in Table 2 show that the cells (Sample Lot 1) with no lead-zinc coating on the anode current collectors had a substantially greater average bulge than the average bulge of the cells (Sample Lot 2) using anode current collectors coated with a layer of lead-zinc.

EXAMPLE 3

Mercury free "D" size cells were produced as in Example 1. Again, the variable of each lot was the anode current collector which was either a copper-zinc alloy anode current collector or a lead-zinc coated copper-zinc alloy anode current collector. The cells were stored at 71° C. for three weeks and at weekly intervals the net average bulge for ten cells in each Sample Lot was measured. The average net bulge data are shown in Table 3.

TABLE 3

| Cells Stored at 71° C. | | | |
|---|---|---|---|
| *Sample Lot 1 | | **Sample Lot 2 | |
| Time (weeks) | Bulge (inch) | Time (weeks) | Bulge (inch) |
| 1 | 0.048 | 1 | 0.018 |
| 2 | 0.062 | 2 | 0.027 |
| 3 | 0.058 | 3 | 0.030 |

*Sample Lot 1 consisted of ten cells each employing an anode current collector comprising 68.5 to 71.5 weight percent copper, balance substantially zinc.
**Sample Lot 2 consisted of ten cells each employing an anode current collector comprising 68.5 to 71.5 weight percent copper, balance substantially zinc. The anode current collector was coated with a lead-zinc mixture containing 498 parts per million lead based on the weight of the lead-zinc mixture. The coating deposited on the anode current collector was 0.61 micron thick.

The data in Table 3 show that the cells (Sample Lot 1) with no lead-zinc coating on the anode current collectors had a substantially greater average bulge than the average bulge of the cells (Sample Lot 2) using anode current collectors coated with a layer of lead-zinc.

EXAMPLE 4

Mercury free "D" size cells were produced as in Example 1. Again, the variable of each lot was the anode current collector which was either a copper-zinc alloy anode current collector or a lead-zinc coated copper-zinc alloy anode current collector. The cells were stored at 71° C. for three weeks and at weekly intervals the net average bulge for ten cells in each Sample Lot was measured. The average net bulge data are shown in Table 4.

TABLE 4

| Cells Stored at 71° C. | | | |
|---|---|---|---|
| *Sample Lot 1 | | **Sample Lot 2 | |
| Time (weeks) | Bulge (inch) | Time (weeks) | Bulge (inch) |
| 1 | 0.048 | 1 | 0.018 |
| 2 | 0.062 | 2 | 0.027 |
| 3 | 0.058 | 3 | 0.032 |

*Sample Lot 1 consisted of ten cells each employing an anode current collector comprising 68.5 to 71.5 weight percent copper, balance substantially zinc.
**Sample Lot 2 consisted of ten cells each employing an anode current collector comprising 68.5 to 71.5 weight percent copper, balance substantially zinc. The anode current collector was coated with a lead-zinc mixture containing 771 parts per million lead based on the weight of the lead-zinc mixture. The coating deposited on the anode current collector was 0.65 micron thick.

The data in Table 4 show that the cells (Sample Lot 1) with no lead-zinc coating on the anode current collectors had a substantially greater average bulge than the average bulge of the cells (Sample Lot 2) using anode current collectors coated with a layer of lead-zinc.

EXAMPLE 5

Mercury free "D" size cells were produced as in Example 1. Again, the variable of each lot was the anode current collector which was either a copper-zinc alloy anode current collector or a lead-zinc coated copper-zinc alloy anode current collector. The cells were stored at 71° C. for three weeks and at weekly intervals the net average bulge for ten cells in each Sample Lot was measured. The average net bulge data are shown in Table 5.

TABLE 5

| Cells Stored at 71° C. | | | |
|---|---|---|---|
| *Sample Lot 1 | | **Sample Lot 2 | |
| Time (weeks) | Bulge (inch) | Time (weeks) | Bulge (inch) |
| 1 | 0.048 | 1 | 0.015 |
| 2 | 0.062 | 2 | 0.020 |
| 3 | 0.058 | 3 | 0.022 |

*Sample Lot 1 consisted of ten cells each employing an anode current collector comprising 68.5 to 71.5 weight percent copper, balance substantially zinc.
**Sample Lot 2 consisted of ten cells each employing an anode current collector comprising 68.5 to 71.5 weight percent copper, balance substantially zinc. The anode current collector was coated with a lead-zinc mixture containing 2070 parts per million lead based on the weight of the lead-zinc mixture. The coating deposited on the anode current collector was 1.99 micron thick.

The data in Table 5 show that the cells (Sample Lot 1) with no lead-zinc coating on the anode current collectors had a substantially greater average bulge than the average bulge of the cells (Sample Lot 2) using anode current collectors coated with a layer of lead-zinc.

EXAMPLE 6

Mercury free "D" size cells were produced as in Example 1. Again, the variable of each lot was the anode current collector which was either a copper-zinc alloy anode current collector or a lead-zinc coated copper-zinc alloy anode current collector. The cells were stored at 71° C. for three weeks and at weekly intervals the net average bulge for ten cells in each Sample Lot was measured. The average net bulge data are shown in Table 6.

TABLE 6

| Cells Stored at 71° C. | | | |
|---|---|---|---|
| *Sample Lot 1 | | **Sample Lot 2 | |
| Time (weeks) | Bulge (inch) | Time (weeks) | Bulge (inch) |
| 1 | 0.048 | 1 | 0.016 |
| 2 | 0.062 | 2 | 0.025 |
| 3 | 0.058 | 3 | 0.025 |

*Sample Lot 1 consisted of ten cells each employing an anode current collector comprising 68.5 to 71.5 weight percent copper, balance substantially zinc.
**Sample Lot 2 consisted of ten cells each employing an anode current collector comprising 68.5 to 71.5 weight percent copper, balance substantially zinc. The anode current collector was coated with a lead-zinc mixture containing 28,600 parts per million lead based on the weight of the lead-zinc mixture. The coating deposited on the anode current collector was 0.78 micron thick.

The data in Table 6 show that the cells (Sample Lot 1) with no lead-zinc coating on the anode current collectors had a substantially greater average bulge than the average bulge of the cells (Sample Lot 2) using anode current collectors coated with a layer of lead-zinc.

Although specific embodiments of this invention have been described, it should be understood that various modifications may be made without departing from the spirit of this invention. For example thickness of the layer of the lead-containing coating on the surface of the substrate could vary greatly as for example from 0.1 micron thick to 100 microns thick as long as the lead is dispersed on the surface of the coating.

What is claimed:

1. An electrochemical cell comprising an anode, a cathode, an alkaline electrolyte, and a conductive anode current collector comprising a substrate coated with a layer of a discontinuous dispersion of lead in which the amount of lead contained in the layer on the surface of the anode current collector is at least 150 parts per million based on the weight of a 0.1 micron thick portion of the layer on the surface of said substrate.

2. The electrochemical cell of claim 1 wherein the amount of lead is from 500 parts per million to 45,000 parts per million based on the weight of a 0.1 micron thick portion of the layer on the surface of said substrate.

3. The electrochemical cell of claim 1 wherein the amount of lead is from 1500 parts per million to 30,000 parts per million based on the weight of a 0.1 micron thick portion of the layer on the surface of said substrate.

4. The electrochemical cell of claim 1 wherein said substrate is selected from the group consisting of steel, copper, zinc and alloys thereof.

5. The electrochemical cell of claim 4 where said substrate is a copper-zinc alloy.

6. The electrochemical cell of claim 5 wherein the copper-zinc alloy contains from 60 to 75 weight percent copper, and 40 to 25 weight percent zinc.

7. The electrochemical cell of claim 1 wherein the substrate of the anode current collector is coated with a layer of a mixture of zinc and lead in which the lead is discontinuously dispersed on the surface of said substrate.

8. The electrochemical cell of claim 7 wherein the conductive anode current collector comprises a copper-zinc alloy substrate containing from 60 to 75 weight percent copper, 40 to 25 weight percent zinc and wherein the amount of lead is from 150 parts per million to 45,000 parts per million based on the weight of a 0.1 micron thick surface portion of the layer on said substrate.

9. The electrochemical cell of claim 4 wherein said substrate is coated with a layer of a mixture of lead and zinc.

10. The electrochemical cell of claim 9 wherein the substrate is a copper-zinc alloy.

11. The electrochemical cell of claim 1 wherein the layer contains cadmium in an amount of at least 1000 parts per million based on the weight of a 0.1 micron thick portion of the layer on the surface of said substrate.

12. The electrochemical cell of claim 1 wherein the layer contains indium in an amount of at least 40 parts per million based on the weight of a 0.1 micron thick portion of the layer on the surface of said substrate.

13. The electrochemical cell of claim 1 wherein the anode is zinc and the cathode is manganese dioxide.

14. The electrochemical cell of claim 13 wherein the alkaline electrolyte is potassium hydroxide.

15. The electrochemical cell of claim 14 wherein said anode contains no mercury.

16. The electrochemical cell of claim 14 wherein the layer contains zinc.

17. The electrochemical cell of claim 14 wherein the substrate is a copper-zinc alloy and the layer contains zinc.

18. The electrochemical cell of claim 17 wherein the lead is present in the layer from 150 to 30,000 parts per million based on the weight of a 0.1 micron thick portion of the layer on the surface of said substrate.

19. The electrochemical cell of claim 18 wherein the layer contains zinc.

* * * * *